United States Patent [19]

Hirosawa et al.

[11] Patent Number: 5,521,886
[45] Date of Patent: May 28, 1996

[54] DIAPHRAGM FOR USE WITH AN ELECTRO-ACOUSTIC TRANSDUCER AND METHOD OF PRODUCING THE SAME

[75] Inventors: Toshio Hirosawa, Kanagawa; Hiroshi Koizumi, Saitama; Hachishiro Kobayashi, Tokyo; Itaru Tanaka, Kanagawa, all of Japan

[73] Assignees: Sony Corporation; Tanaka Kogyo Corporation Limited, both of Tokyo, Japan

[21] Appl. No.: 266,981

[22] Filed: Jun. 28, 1994

[30] Foreign Application Priority Data

Jun. 28, 1993 [JP] Japan .................................. 5-157420

[51] Int. Cl.⁶ ..................................................... H04R 7/02
[52] U.S. Cl. ............................ 367/174; 29/594; 381/193
[58] Field of Search ................................ 367/174, 163; 310/324; 381/193, 190; 29/594, 609.1

[56] References Cited

U.S. PATENT DOCUMENTS 3,961,378  6/1976  White .
5,099,949  3/1992  Mitobe ............................... 181/171
5,321,761  6/1994  Kitanishi ............................ 381/190

FOREIGN PATENT DOCUMENTS

0492914A3  7/1992  European Pat. Off. .
0552040A1  7/1993  European Pat. Off. .
2056817    3/1981  United Kingdom .
2228391    8/1990  United Kingdom .

OTHER PUBLICATIONS

*Japanese Patent Abstract*, No. JP58201496, dated 24 Nov. 1993, vol. 8, No. 49.

*Primary Examiner*—Charles T. Jordan
*Assistant Examiner*—Christopher K. Montgomery
*Attorney, Agent, or Firm*—Hill, Steadman & Simpson

[57]  ABSTRACT

A diaphragm for use with an electro-acoustic transducer includes a diaphragm portion, an edge portion and a supporting portion. The diaphragm portion is molded by a synthetic resin material, such as polypropylene or the like. The edge portion is molded integrally with the supporting portion by a thermoplastic synthetic resin material and provided at the outer peripheral side of the diaphragm portion. The edge portion is molded integrally with the diaphragm portion by dichromatic molding.

1 Claim, 5 Drawing Sheets

5,521,886

DIAPHRAGM FOR USE WITH AN ELECTRO-ACOUSTIC TRANSDUCER AND METHOD OF PRODUCING THE SAME

BACKGROUND

1. Field of the Invention

The present invention relates to a diaphragm for use with an electro-acoustic transducer and a method of producing the same and, more particularly, to a diaphragm for use with an electro-acoustic transducer and a method of producing the same by using synthetic resin materials.

2. Background of the Invention

A method of producing a diaphragm for use with an electro-acoustic transducer which becomes a premise of the present invention will be described below with reference to FIG. 1a to 1d and FIGS. 2a to 2c of the accompanying drawings. The above-mentioned diaphragm for use with an electro-acoustic transducer will be referred to hereinafter simply as "diaphragm".

Initially, a member 31 of substantially truncated cone configuration shown in FIG. 1a is produced. The substantially truncated cone-shaped member 31 is produced by some suitable methods, such as sheet-making of paper and pulp, pressing of polymer film under heating or injection-molding of olefin thermoplastic resin. The substantially truncated cone-shaped member 31 is cut out at its portion shown by a one-dot chain line in FIG. 1a to provide an outer diameter portion 32 and a bottom portion 33. As a result, the member 31 is manufactured as a cone-shaped diaphragm member 34 shown in FIG. 1b.

A member 37 of substantially saucer configuration shown in FIG. 1c is produced by heating and molding a material, such as cotton cloth, rubber, polyurethan foam, elastomer or the like. The substantially saucer-shaped member 37 is cut out at its positions of diameters φA and φB shown by one-dot chain lines in FIG. 1c to provide an outer peripheral portion and an inner peripheral portion.

As a consequence, the substantially saucer-shaped member 37 is manufactured as an annular-shaped edge member 38 shown in FIG. 1d. The edge member 38 includes an edge portion 38a of substantially U-shaped cross section. To join the diaphragm member 34 and the edge member 38 thus formed, the diaphragm member 34 is coated at its outer surface portion of the outer peripheral side with an adhesive 35 as shown in FIG. 2a. Then, the edge member 38 is positioned on a mold 41 by engaging the edge portion 38a of the edge member 38 with a protrusion 41a of the mold 41 of the molds 40 and 41. Under this condition, an opening portion 34a of the diaphragm member 34 is fitted into a columnar portion 41a by downwardly inserting the diaphragm member 34 into the mold 41. The diaphragm member 34 is positioned on the mold 41. Subsequently, the mold is closed by lowering the mold 40 of the molds 40, 41 in FIG. 2b, and the diaphragm 34 and the edge member 38 are pressed. In this case, the molds 40, 41 are heated at a predetermined temperature, the adhesive 35 is cured under pressure produced when the molds 40, 41 are pressed. Consequently, as shown in FIG. 2c, the diaphragm member 34 and the edge member 38 are joined together.

According to the method of producing a diaphragm shown in FIGS. 1a to 1d and FIGS. 2a to 2c, the diaphragm member 34 and the edge member 38 are produced separately, and the diaphragm member 34 and the edge member 38 are manufactured as the predetermined shapes, whereafter the diaphragm member 34 and the edge member 38 are bonded together by the adhesive 35.

When however the diaphragm member 34 is made of olefin thermoplastic resin and the edge member 38 is made of synthetic rubber or elastomer, a pre-treatment should be carried out in order to improve an adhesive property. In the pre-treatment, after the diaphragm member 34 and the edge member 38 are manufactured as the predetermined shapes, either or both of the diaphragm member 34 and the edge member 38 are coated with a primer, whereafter the adhesive 35 is coated on the diaphragm member 34 and the diaphragm member 34 and the edge member 38 are bonded together by means of the adhesive 35. Therefore, the number of manufacturing processes is increased, which unavoidably increases the manufacturing cost of the diaphragm.

When the diaphragm member 34 and the edge member 38 are bonded together, the diaphragm member 34 and the edge member 38 should be bonded under the condition that a center of the diaphragm member 34 and a center of the edge member 38 are coincident with each other. If the center of the diaphragm member 34 and the center of the edge member 38 are displaced from each other after the diaphragm member 34 and the edge member 38 are bonded together, then the diaphragm cannot be vibrated correctly. Particularly, in the speaker apparatus of dynamic type, when the diaphragm is displaced in position, a voice coil bobbin that is attached to the diaphragm member also is displaced in position. There is then the new problem that a magnetic circuit is disturbed by the voice coil bobbin.

From an acoustic characteristic standpoint of the diaphragm, since the adhesive is interposed at the portion in which the outer peripheral edge of the diaphragm member and the inner peripheral edge of the edge member are bonded, the acoustic characteristic of the diaphragm and the quality of the diaphragm are influenced by the cured state of the adhesive and the types of the adhesives or the joined state of the diaphragm member and the edge member. As a result, the characteristic of the diaphragm thus mass-produced tends to become irregular. Therefore, it becomes impossible to obtain a diaphragm of high reliability. Moreover, when the diaphragm thus produced is used, it becomes impossible to mass-produce speaker apparatus of uniform tone quality.

SUMMARY OF THE INVENTION

It is, therefore, an object of the present invention to provide a diaphragm for use with an electro-acoustic transducer in which the above-mentioned problems can be solved.

It is another object of the present invention to provide a method of producing a diaphragm for use with an electro-acoustic transducer in which the above-mentioned problems can be solved.

According to the present invention, there is provided a diaphragm for use with an electro-acoustic transducer which includes a diaphragm portion and an edge portion. The edge portion is provided at the outer peripheral side of the diaphragm portion. The edge portion is molded integrally with the diaphragm portion by dichromatic molding.

According to the present invention, there is provided a method of molding a diaphragm for use with an electro-acoustic transducer which includes a diaphragm portion, an edge portion provided at the outer peripheral side of the diaphragm portion and a supporting portion for supporting the edge portion. This molding method includes a first process and a second process. According to the first process, at least any one of the diaphragm portion and the edge portion is molded with a first cavity of a metallic mold by injection molding of a first synthetic resin material. According to the second process, the other of the diaphragm portion and the edge portion is molded to a portion molded by the first process with a second cavity of the metallic mold by injection molding of a second synthetic resin material.

In accordance with the present invention, since the diaphragm portion and the edge portion of the diaphragm for use with an electro-acoustic transducer are integrally molded by dichromatic molding, it becomes possible to mold respective portions of the edge portion and the diaphragm portion by materials selected from materials which can satisfy characteristics of the respective portions. Further, since the edge portion and the diaphragm portion are integrally molded with each other by dichromatic molding, it becomes possible to simplify the manufacturing process of the diaphragm. Also, it becomes possible to prevent the edge portion and the diaphragm portion from being detached when an adhesive for bonding the edge portion and the diaphragm portion is deteriorated. Furthermore, since the edge portion and the diaphragm portion are molded integrally, it is possible to prevent the center of the edge portion and the center of the diaphragm portion from being displaced from each other. According to the present invention, since a substance, such as an adhesive or the like, is not interposed between the edge portion and the diaphragm portion, it is possible to avoid a frequency characteristic from being deteriorated.

BRIEF DESCRIPTION OF THE DRAWINGS

The present invention will be more readily understood with reference to the accompanying drawings, wherein:

FIGS. 1a through 1d show manufacturing processes of a diaphragm member and an edge member of a diaphragm for an electro-acoustic transducer which becomes a premise of the present invention, in which:

FIG. 1a is a cross-sectional view showing a cross section of a member of substantially truncated cone configuration obtained after the manufacturing process;

FIG. 1b is a cross-sectional view showing a cross section of a cone-shaped diaphragm member;

FIG. 1c is a cross-sectional view showing a cross section of a substantially saucer-shaped member; and FIG. 1d is a cross-sectional view showing a cross section of an edge member;

FIGS. 2a to 2c show manufacturing processes of a diaphragm, in which:

FIG. 2a is a cross-sectional view showing the state that an adhesive is coated on the diaphragm member;

FIG. 2b is a cross-sectional view showing the state that the diaphragm member and the edge member are attached to the molds; and FIG. 2c is a cross-sectional view showing the diaphragm obtained after the molds were bonded;

FIGS. 3a and 3b show a diaphragm for use with an electro-acoustic transducer according to the present invention and a speaker apparatus using the diaphragm according to the present invention, in which:

FIG. 3a is a cross-sectional view showing a cross section of the diaphragm according to the present invention; and FIG. 3b is a cross-sectional view schematically showing an arrangement of a speaker apparatus serving as the electro-acoustic transducer using the diaphragm according to the present invention;

FIG. 4a is a cross-sectional view used to explain a schematic arrangement of a molding metallic mold;

FIG. 4b is a cross-sectional view showing the state that a diaphragm portion is molded; and FIG. 4c is a cross-sectional view showing the state that an edge portion and a gasket portion are molded;

DESCRIPTION OF THE PREFERRED EMBODIMENT

A diaphragm for use with an electro-acoustic transducer (referred to hereinafter simply as "diaphragm") and a method of producing the same according to an embodiment of the present invention will be described below with reference to the drawings.

The embodiment of the present invention will be described hereinafter on the assumption that the diaphragm is used as the diaphragm of the speaker apparatus.

Figure 1A:
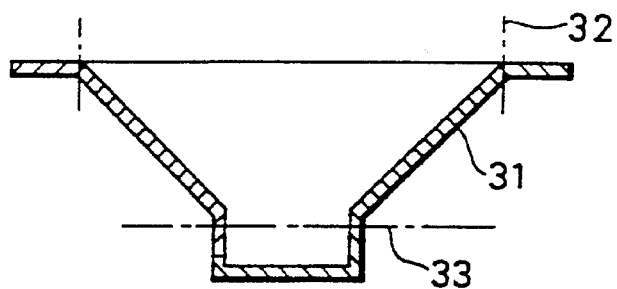
Figure 1B:
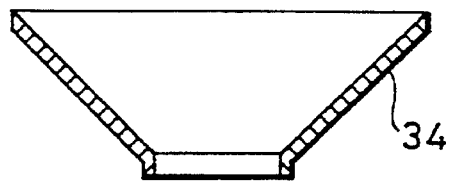
Figure 1C:
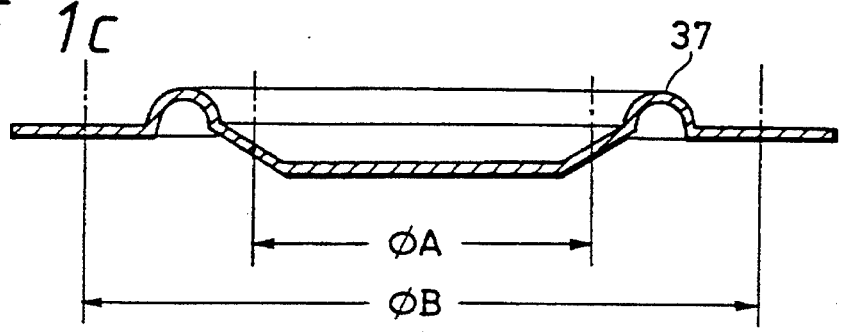
Figure 1D:
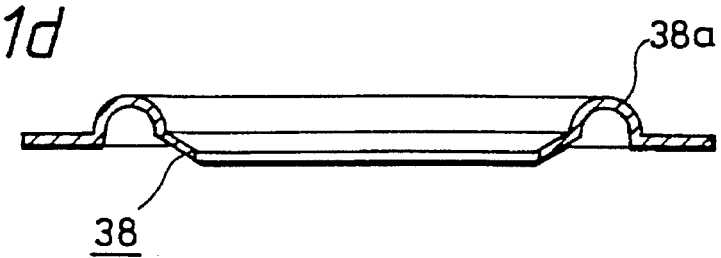
Figure 2A:
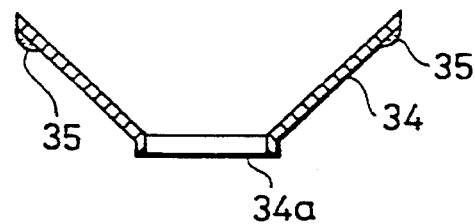
Figure 2B:
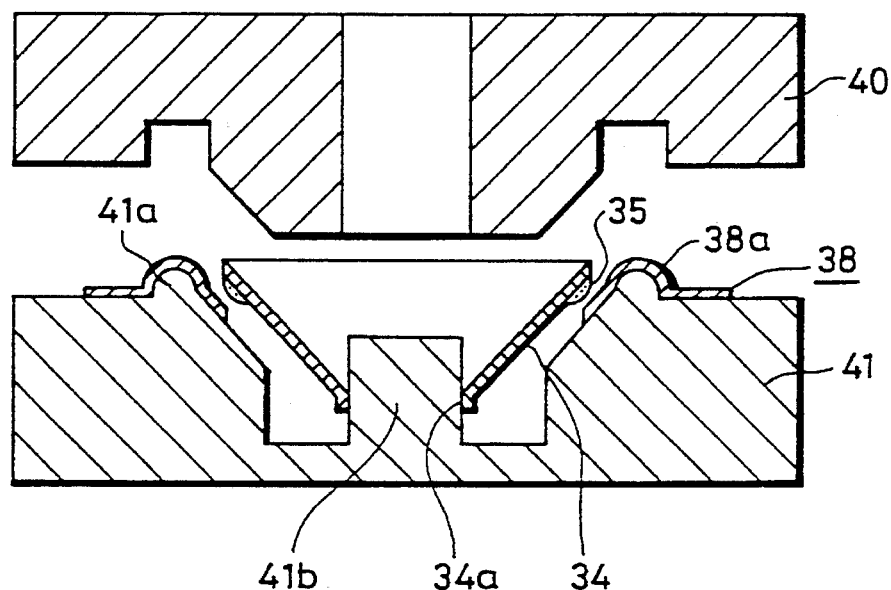
Figure 2C:
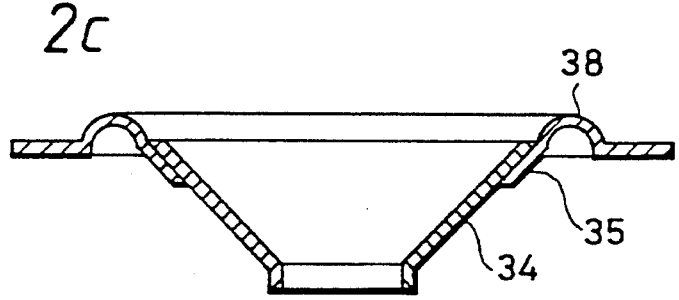
Figure 3A:
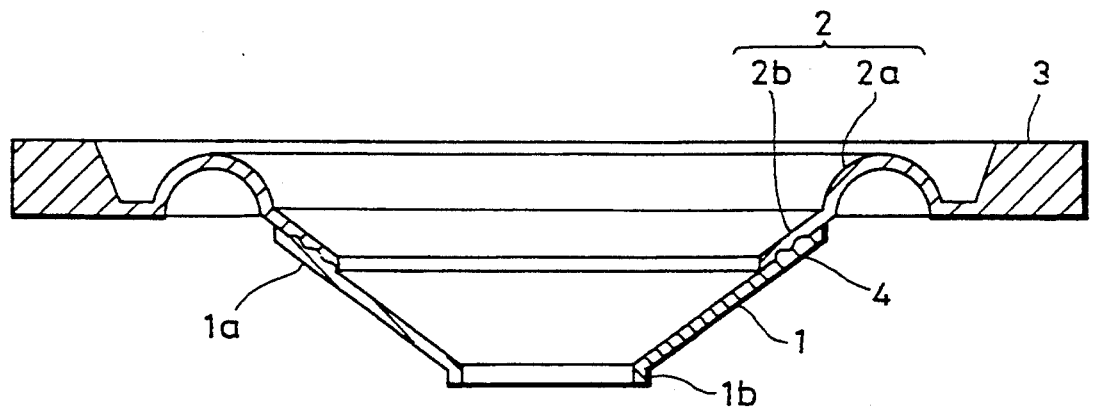

FIG. 3a shows a cross section of a diaphragm according to the embodiment of the present invention. As shown in FIG. 3a, there is provided a cone-shaped diaphragm portion 1. The cone-shaped diaphragm portion 1 includes at one end thereof a joint portion 1a whose inner surface of large diameter opening portion is joined with an edge portion, which will be described later on, and also includes on the other end thereof an attachment portion 1b of the small-diameter opening portion to which a voice coil bobbin (not shown) is attached. The diaphragm portion 1 is formed by injection molding of polypropylene (PP) of polyolefin resin.

An edge portion 2 includes a displacement portion 2a of substantially U-shaped cross section and a joined portion 2b which is joined to the joint portion 1a of the diaphragm portion 1. The joint portion 1a of the diaphragm portion 1 and the joined portion 2b of the edge portion 2 are joined together by molding which will be described later on, thereby constructing a joint portion 4 which joins the diaphragm portion 1 and the edge portion 2. The diaphragm portion 1 can be translated by the displacement portion 2a of the edge portion 2 in the upper and lower direction in FIG. 3a.

A gasket portion 3 is integrally provided on the outer peripheral side of the edge portion 2 through the edge portion 2 and a thin portion. The gasket portion 3 is attached to the upper surface of the frame of the speaker apparatus (not shown).

The edge portion 2 and the gasket portion 3 are integrally molded together by using saturated thermoplastic elastomer. The saturated thermoplastic elastomer can be molded by injection molding and extrusion molding by a standard plastic molding machine and can be melted with the material of the diaphragm portion 1, i.e., polypropylene satisfactorily.

An arrangement of a speaker apparatus using the diaphragm thus arranged will be described below with reference to FIG. 3b.

Figure 3B:
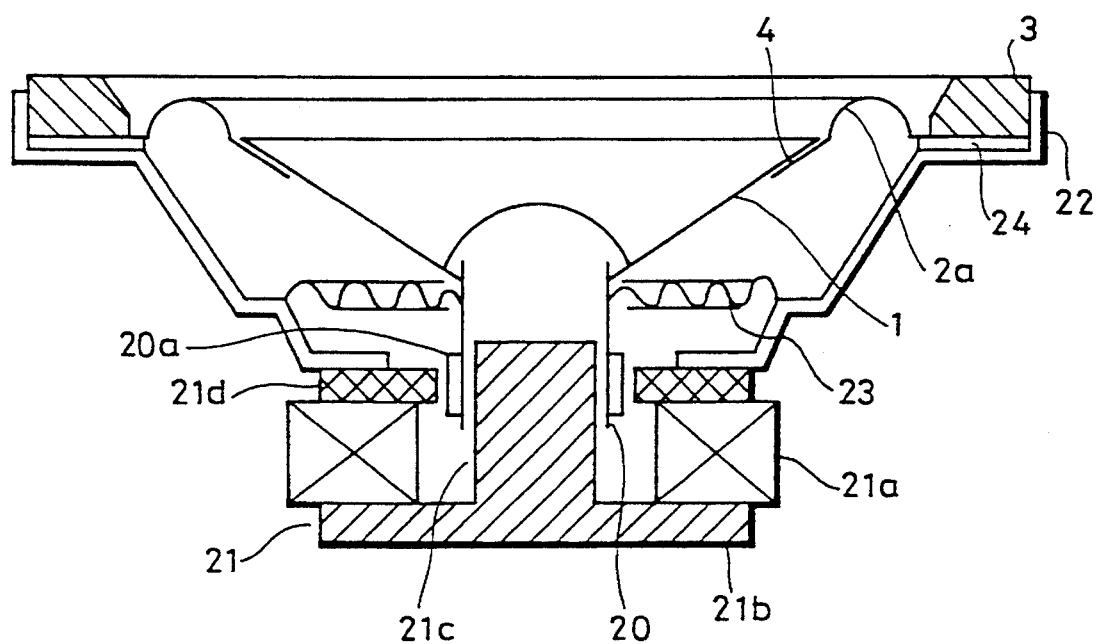

As shown in FIG. 3b, a voice coil bobbin 20 is joined to the attachment portion 1b of the diaphragm portion 1. The voice coil bobbin 20 is inserted into a gap of a magnetic circuit 21. The magnetic circuit 21 includes a permanent magnet 21a, a yoke 21b having a center pole 21c and a top plate 21d. The top plate 21d is disposed in an opposing relation to a voice coil 20a wound around the voice coil bobbin 20. The voice coil 20a is supplied with an input signal through a litz wire (not shown). The permanent magnet 21a is disposed between the yoke 21b and the top plate 21d. A frame 22 is attached on the top plate 21d, and the frame 22 has on its upper surface portion bonded the gasket portion 3 by an adhesive 24. A damper 23 is disposed between the joined portion of the diaphragm portion 1 and the voice coil bobbin 20 or the nearby position and the frame 22. The damper 23 and the displacement portion 2a of the edge portion 2 support the diaphragm such that the diaphragm can be slid in the upper and lower direction shown in FIG. 3b. As a consequence, the diaphragm is vibrated by a driving force generated by the magnetic circuit 21 and the voice coil 20a of the voice coil bobbin 20 in the upper and lower direction shown in FIG. 3b.

A method of molding the above-mentioned diaphragm will be described with reference to FIGS. 4a to 4c.

Figure 4A:
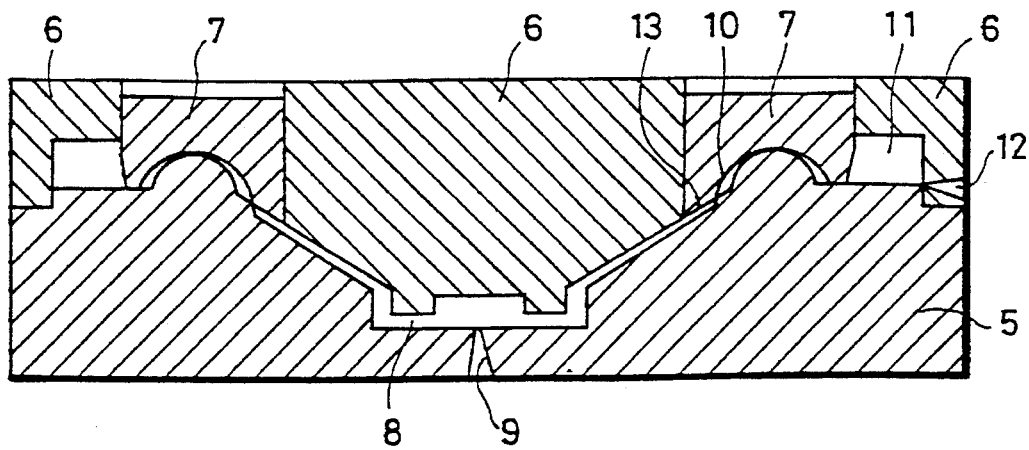
FIGS. 4a to 4c are cross-sectional views showing the molding processes of the diaphragm according to the present invention.
Figure 4B:
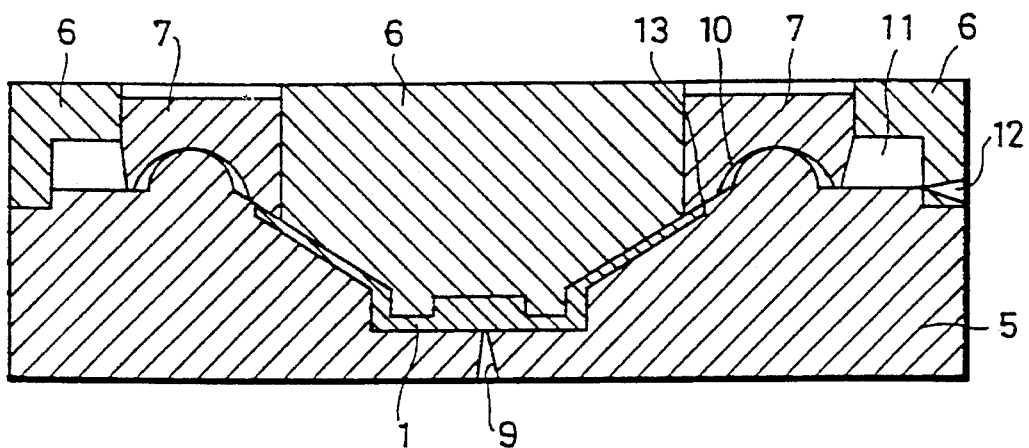
Figure 4C:
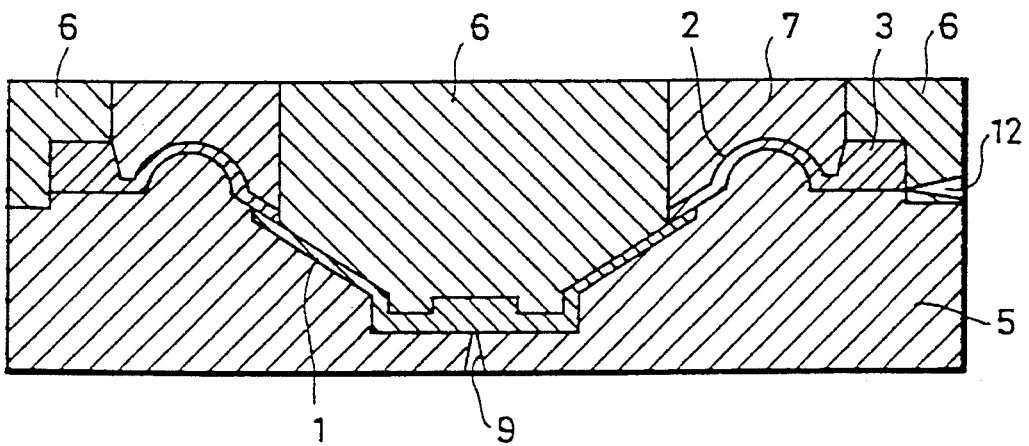

FIG. 4a shows a cross section of a molding metallic mold. As shown in FIG. 4a, the molding metallic mold comprises a first metallic mold 5, a second metallic mold 6 and a third metallic mold 7 of a core-back type. The first and second metallic molds 5 and 6 constitute a first cavity 8 by which the diaphragm portion 1 is molded. The first metallic mold 5 includes a primary gate 9 through which a molding material of the diaphragm portion 1 is injected into the first cavity 8.

The first and third metallic molds 5 and 7 constitute a second cavity 10 by which the edge portion 2 is molded. The inner peripheral portion of the third metallic mold 7 forms a part of the first cavity 8 which molds the diaphragm portion 1. The first, second and third metallic molds 5, 6 and 7 constitute a third cavity 11 which molds the gasket portion 3. The second metallic mold 6 includes a secondary gate 12 through which the molding material of the edge portion 2 and the gasket portion 3 are injected into the second and third cavities 10 and 11.

The diaphragm is molded according to the following processes.

Initially, the diaphragm portion 1 is molded by injecting the molding material made of polypropylene into the first cavity 8 from the primary gate 9. At that time, the third metallic mold 7 is brought in contact with the first metallic mold 5 at a portion shown by reference numeral 13 in FIGS. 4a and 4b and the first cavity 8 is formed of the first, second and third metallic molds 5, 6 and 7 so that the first cavity 8 and the second cavity 10 are isolated from each other, thereby preventing the molding material injected into the first cavity 8 from being flowed into the second cavity 10.

After the diaphragm portion 1 is molded, the edge portion 2 and the gasket portion 3 are molded before the molding material that was injected into the first cavity 8 to mold the diaphragm portion 1 is solidified completely. Specifically, after the diaphragm portion 1 is molded, the third metallic mold 7 is slid backwardly within 10 seconds, for example, as shown in FIG. 4c, and the edge portion 2 and the gasket portion 3 are molded by injecting the molding material made of saturated thermoplastic elastomer into the second and third cavities 10, 11 from the secondary gate 12. At that time, the molding material that was injected into the second cavity 10 is brought in contact with the joint portion 1a of the diaphragm portion 1 that was previously molded within the first cavity 8. The molding material injected into the second cavity 10 and which is in contact with the joint portion 1a of the diaphragm portion 1 is melted with the material of the diaphragm portion 1 and therefore the edge portion 2 and the diaphragm portion 1 are combined under the condition that the molding material is fully solidified. In this way, the molding operation of the diaphragm portion 1, the edge portion 2 and the gasket portion 3 is ended.

Figure 5:
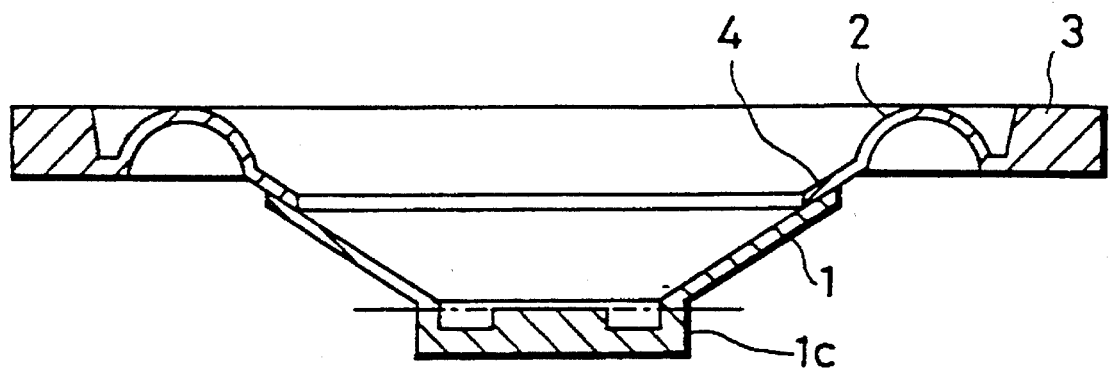
FIG. 5 is a cross-sectional view showing a diaphragm taken out from the molding metallic mold.

After the diaphragm portion 1, the edge portion 2 and the gasket portion 3 are solidified since the edge portion 2 and the gasket portion 3 were molded, the molding metallic mold is opened and the diaphragm is detached from the molding metallic mold. The diaphragm taken out from the molding metallic mold includes a base portion 1c to close the opening portion of the attachment portion 1b as shown in FIG. 5. The base portion 1c is cut out from the diaphragm at the position shown by a one-dot chain line in FIG. 5 so that the diaphragm in which the diaphragm portion 1, the edge portion 2 and the gasket portion 3 are molded integrally as shown in FIG. 3a is produced.

The diaphragm thus molded and produced according to the present invention can solve the problem that the center of the diaphragm portion 1 and the center of the edge portion 2 are displaced from each other unlike the diaphragm produced according to the processes shown in FIGS. 1a to 1d and FIGS. 2a to 2c. Moreover, the quality of the mass-produced diaphragms can be kept constant. Further, the bonding of the edge portion, the gasket portion or the like need not be carried out and therefore the number of processes required when an electro-acoustic transducer like the speaker apparatus is assembled can be reduced, thereby the manufacturing cost being decreased.

Figure 6:
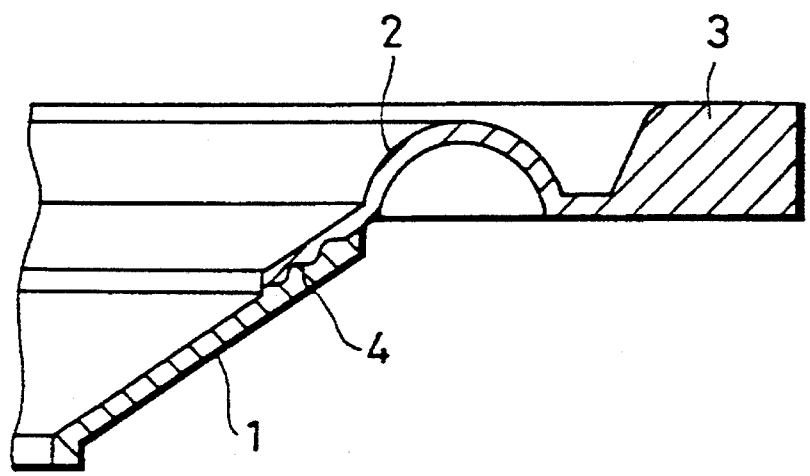
FIG. 6 is an enlarged fragmentary cross-sectional view showing a joined portion of the diaphragm according to the present invention.

In the diaphragm according to the present invention, the third metallic mold 7 constructing a part of the first cavity 8 includes concave and convex surfaces. Then, when the diaphragm portion 1 is molded by the first cavity 8, the diaphragm portion 1 has at its portion corresponding to the concave and convex surfaces of the third metallic mold 7 formed concave and convex portions. When the edge portion 2 is molded by the secondary molding, the molding material of the edge portion 2 is melted with the concave and convex portions of the diaphragm portion 1 and united with the diaphragm portion 1. Thus, as shown in FIG. 6, an area of the joint portion 4 in which the diaphragm 1 and the edge portion 2 are melted with each other can be increased and a mechanical strength of the joint portion 4 can be improved.

While the diaphragm portion 1 is made of polypropylene (PP) as described above, the present invention is not limited thereto and olefin thermoplastic resins can be widely applied to the diaphragm portion 1.

The material of the edge portion 2 and the gasket portion 3 is not limited to the aforesaid materials and olefin elastomer and synthetic rubber may be used.

Further, while the diaphragm portion 1 is molded prior to the edge portion 2 and the gasket portion 3 according to the molding method of the present invention, the present invention is not limited thereto and the following variants are also possible. That is, the edge portion 2 and the gasket portion 3 may be molded prior to the diaphragm portion 1 and the diaphragm portion 1 is molded later. Furthermore, the edge portion 2 and the gasket portion 3 may be molded by different kinds of materials according to dichromatic molding, thereby enlarging a scope in which the materials of the gasket portion 3 can be selected.

Having described a preferred embodiment of the invention with reference to the accompanying drawings, it is to be understood that the invention is not limited thereto and that various changes and modifications could be effected therein by one skilled in the art without departing from the spirit or scope of the invention as defined in the appended claims.

What is claimed is:

1. A method of molding a diaphragm for use with an electro-acoustic transducer having a diaphragm portion, an edge portion provided at an outer peripheral side of said diaphragm portion and a supporting portion for supporting said edge portion comprising:

a first process for molding at least any one of said diaphragm portion and said edge portion with a first cavity of a metallic mold by injection molding of a first synthetic resin material; and a second process for molding the other of said diaphragm portion and said edge portion to a portion molded by said first process with a second cavity of said metallic mold by injection molding of a second synthetic resin material, wherein said mold for said second cavity is partially open when said injection molding takes place in said first cavity, and said mold for said second cavity is fully open when said injection molding takes place in said second cavity.

* * * * *